United States Patent

Heimann et al.

[11] Patent Number: 5,263,510
[45] Date of Patent: Nov. 23, 1993

[54] ESCUTCHEON FOR RECESSED PLUMBING FIXTURE

[75] Inventors: Bruno Heimann, Fröndenberg-Ardey; Harald Dickel, Iserlohn, both of Fed. Rep. of Germany

[73] Assignee: Friedrich Grohe Aktiengesellschaft, Fed. Rep. of Germany

[21] Appl. No.: 968,995

[22] Filed: Oct. 30, 1992

[30] Foreign Application Priority Data

Dec. 18, 1991 [DE] Fed. Rep. of Germany ....... 4141790

[51] Int. Cl.⁵ ................................................ F16L 5/00
[52] U.S. Cl. .................................... 137/359; 292/357; 411/15; 411/55
[58] Field of Search ............... 137/359, 801; 292/357; 411/15, 16, 54, 55

[56] References Cited

U.S. PATENT DOCUMENTS

| | | | |
|---|---|---|---|
| 1,943,140 | 1/1934 | Niedecken | 137/359 |
| 4,289,062 | 9/1981 | Schiefer | 411/15 X |
| 4,579,492 | 4/1986 | Kazino et al. | 411/15 X |
| 4,989,278 | 2/1991 | Kostorz | 137/359 X |
| 5,161,567 | 11/1992 | Humpert | 137/359 |

Primary Examiner—Martin P. Schwadron
Assistant Examiner—Kevin L. Lee
Attorney, Agent, or Firm—Herbert Dubno; Andrew Wilford

[57] ABSTRACT

An escutcheon used with a plumbing fixture that is recessed in a wall and that has a part projecting through the wall itself has a plate shaped to fit around the part flatly against the wall and formed offset from the part with a throughgoing hole. Structure fixed relative to the fixture forms a throughgoing hole offset from the part snugly receiving a radially expansible anchor tube also extending through the plate hole and having an enlarged head lying against an outer face of the plate. A screw engaged in the tube radially expands same into tight engagement with the structure hole.

6 Claims, 5 Drawing Sheets

ESCUTCHEON FOR RECESSED PLUMBING FIXTURE

FIELD OF THE INVENTION

The present invention relates to an escutcheon assembly for a recessed plumbing fixture. More particularly this invention concerns such an escutcheon used with a wall-mount temperature-control valve.

BACKGROUND OF THE INVENTION

It is standard as described in U.S. Pat. No. 4,989,278 for a wall-mount faucet assembly to have a mounting fitting adapted to be fixed in the wall and connected to incoming hot- and cold-water lines. This fitting is formed with an outwardly directed seat provided with hot- and cold-water ports to which can be fastened an end of a substantially cylindrical body centered on an axis of a mixing faucet. An annular holder has two parts that engage complementarily around the faucet body adjacent the base and against the wall and that can be secured together to clamp the holder to the faucet body. An annular cover plate engageable around the faucet body and over the holder axially with the wall is fastened to this holder to lock it in place. The cover plate includes a main part formed with a radially open slot wide enough to fit over the faucet body, and a filler part complementarily engageable in the slot.

The main problem with such an arrangement is that the screws that are engaged through the main part of the cover plate and into the fixture can be tightened too much so that they deform the cover plate. It is even possible for the screws to be tightened such that the cover plate only deforms over time, not immediately.

It is further known, for example from U.S. patent application Ser. No. 07/786,391, (now U.S. Pat. No. 5,161,567) for the recessed plumbing fixture to be equipped with an escutcheon having a main plate shaped to fit around the projecting fixture part flatly against the wall and to cover the hole, at least one fastener engageable through the main plate with the fixture to press the plate against the wall, a cover plate fittable on the main plate over the fastener, and formations integrally formed with the plates and securing the plates together. The main plate has an outer periphery provided with a soft seal ring engaging the wall. In addition the main plate has inward of its outer periphery a central recess in which the cover plate is received. The formations include pins unitarily formed on the cover plate and complementary seats unitarily formed in the main plate.

These integral coupling pins, which may be set up so that a screw can be inserted in them to spread them, allow only minimal adjustment for different mounting depths. This is particularly disadvantageous because the plumbing fitting is frequently roughed in so that when the wall and tile is complete it is not at the required spacing from the finished-wall surface.

OBJECTS OF THE INVENTION

It is therefore an object of the present invention to provide an improved escutcheon for a recessed plumbing fixture.

Another object is the provision of such an improved escutcheon for a recessed plumbing fixture which overcomes the above-given disadvantages, that is which can be mounted without being deformed yet which can be fitted to plumbing fixtures installed over a wide range of depths in the wall.

SUMMARY OF THE INVENTION

The instant invention is an escutcheon used with a plumbing fixture that is recessed in a wall and that has a part projecting through the wall. The escutcheon has a plate shaped to fit around the part flatly against the wall and formed offset from the part with a throughgoing hole. Structure fixed relative to the fixture forms a throughgoing hole offset from the part snugly receiving a radially expansible anchor tube also extending through the plate hole and having an enlarged head lying against an outer face of the plate. A screw engaged in the tube radially expands same into tight engagement with the structure hole.

Thus with this system the tube anchors secure the plate to the structure, typically part of the fitting, in such a manner that on the one hand the plate is very solidly mounted but on the other hand it is highly unlikely that enough force can be brought to bear to deform the plate. What is more the anchor tubes and screws can be relatively long to accommodate a wide range in variation of depth of the plumbing fitting.

According to the invention the plate hole is stepped and the head of the anchor tube is recessed in it. More particularly the plate head and an outer recessed seat region of the plate hole are of noncircular shape and fit complementarily together so that the anchor tube cannot rotate relative to the plate when its head is fitted in the plate hole seat.

Furthermore in accordance with this invention the anchor tube is formed with at least one outwardly projecting inclined latch finger pointing back toward the plate when the anchor tube is inserted through the plate hole. The anchor tube is formed with at least one longitudinally extending expansion slit.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
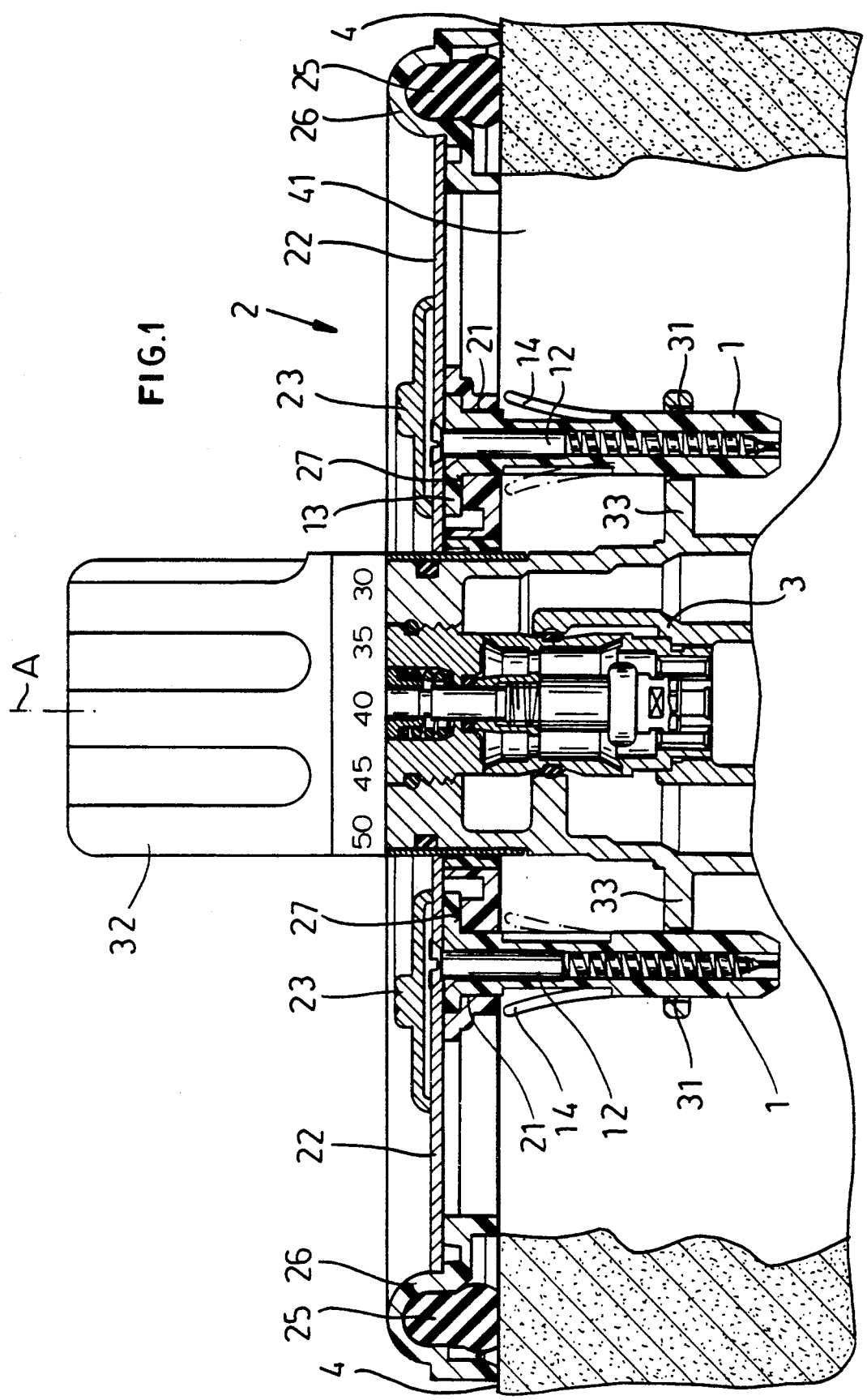
FIG. 1 is an axial section through the fitting and escutcheon according to the invention.
Figure 2:
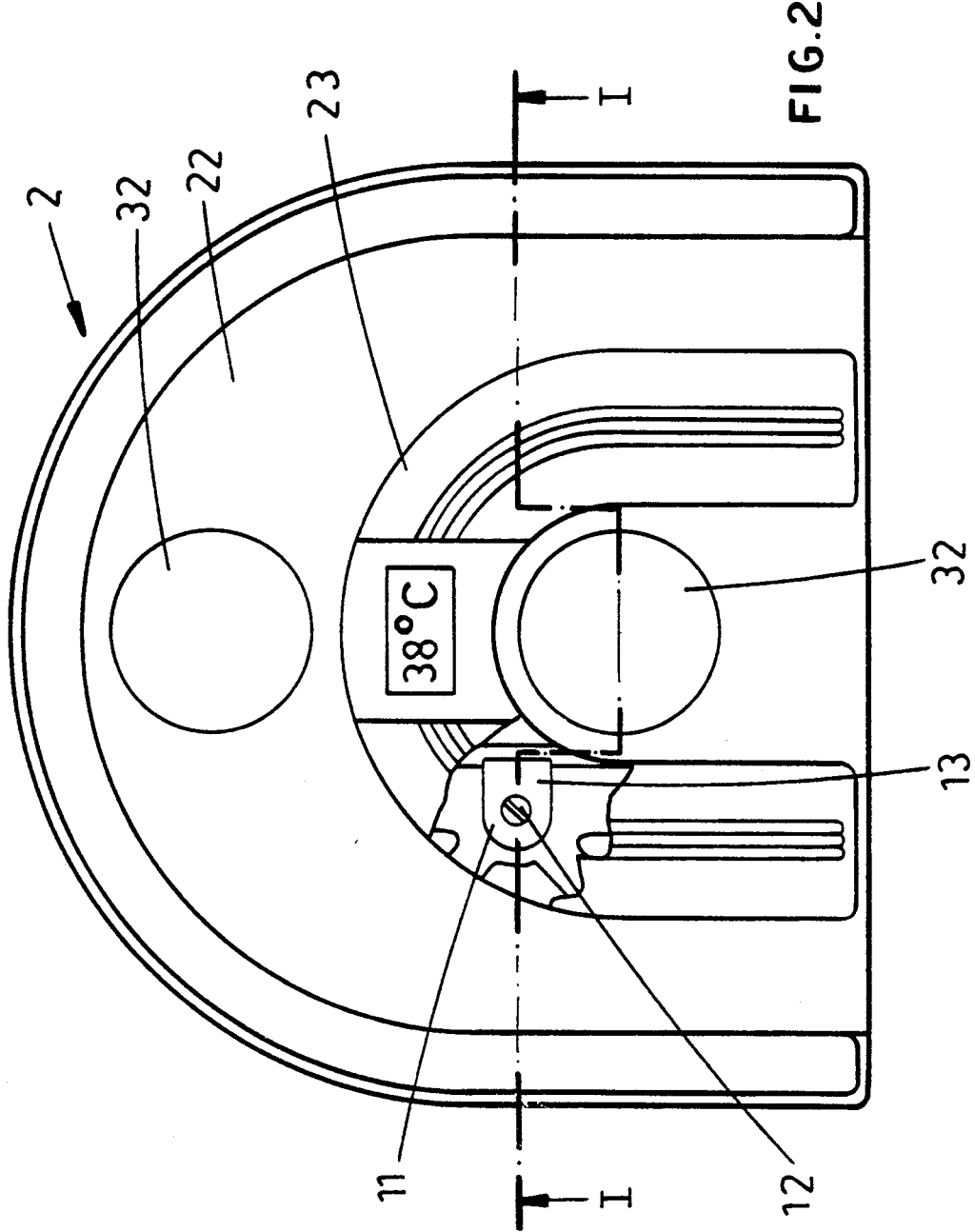
FIG. 2 is a front view of the assembly.
Figure 3:
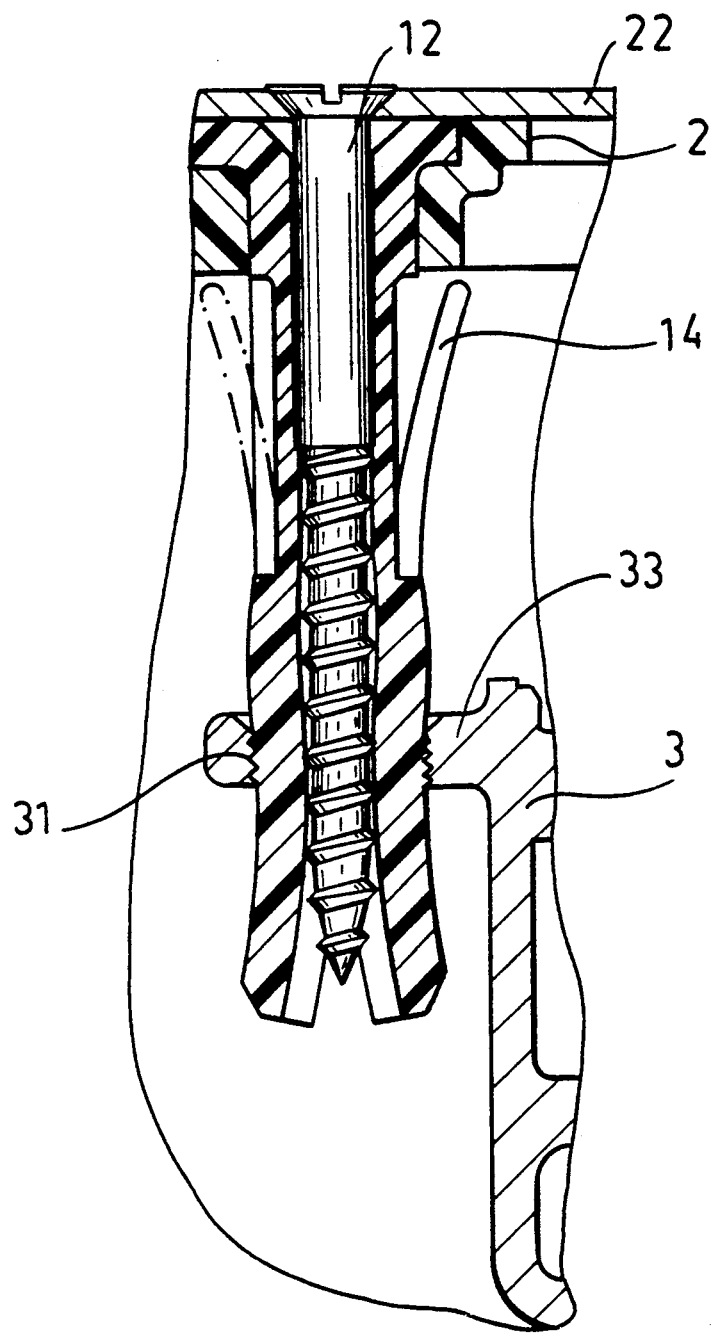
FIG. 3 is a large-scale view of a detail of FIG. 1.
Figure 4:
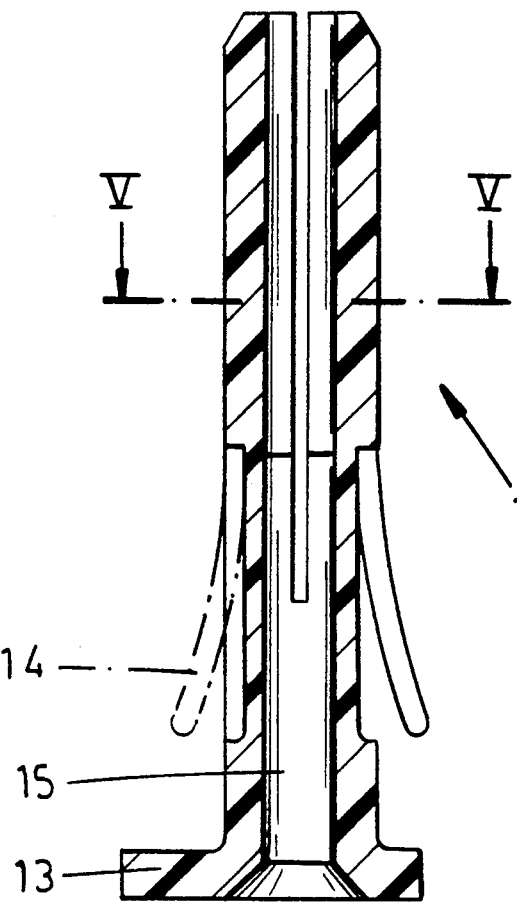
FIG. 4 is an axial section through the anchor tube.
Figure 5:
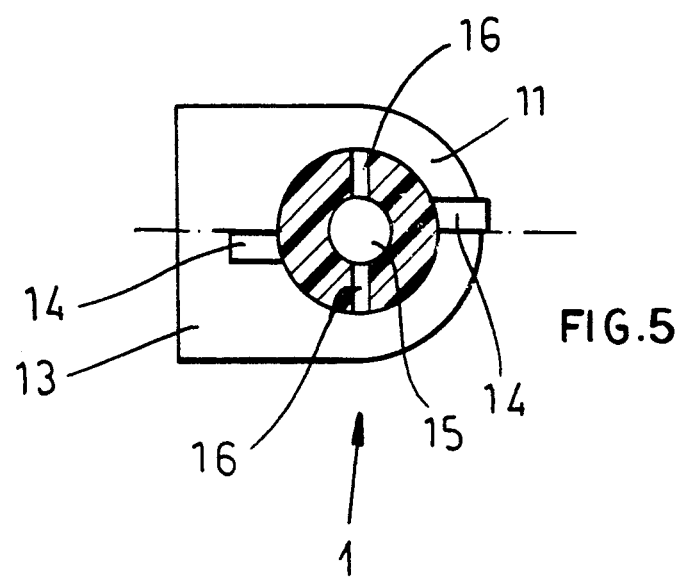
FIG. 5 is a section taken along line V—V of FIG. 4.

As seen in FIG. 1, a plumbing fixture 3, here a thermostatically controlled valve, is recessed in a cavity 41 formed in a wall 4 and has pair of adjustment knobs 32 one of which is centered on an axis A perpendicular to the wall 4. This fixture 3 has a metallic body formed with two diametrally oppositely projecting tabs 33 each formed with an axially throughgoing hole 31.

A main escutcheon plate 2 made of a durable synthetic resin has a backwardly concave outer periphery 26 provided with a seal 25 that is pressed against the wall 4. This plate 2 fits snugly around the knobs 32 and generally covers the hole 41 in the wall 4 that the fitting 3 is recessed in. On its front face it is provided with a decorative cover plate 22 in turn covered by a cover ring 23.

Two anchor tubes 1 made of a durable synthetic resin each have an enlarged head 11 with a lateral projection 13 giving the head 11 a noncircular shape. Each head 11 is recessed in a seat 27 formed around an axially throughgoing bore 21 formed through the escutcheon 2 in line with a respective one of the bores 31, and each tube 1 also extends through the respective hole 31 which it fits fairly snugly in. Each tube 1 is furthermore formed with a central passage or bore 15, with two diametrally opposite, radially throughgoing, and longitudinally extending slits 16, and with two diametrally opposite fingers 14 that point outward and generally forward toward the respective head 11. Thus when each tube 1 is pressed through the respective bore 21 its fingers 14 will be pressed inward and then pop out to prevent withdrawal, and the tubes 1 will also fit through the respective fixture bores 31. The passages 15 accommodate screws 12 whose heads bear backwardly against the front face of the cover plate 22.

Thus to mount the escutcheon assembly in place first of all the plate 2 is pressed against the wall 4 over the fitting 3. Then the tubes 1 are pressed through the bores 21 and 31, with the fingers 14 preventing subsequent withdrawal of the tubes 1. The cover plate 22 is then fitted in place and the screws 12 are then screwed home in the tubes 1. This radially expands the tubes 1 in the bores 1, thereby axially locking them in place, and the screw heads hold the plate 22 down on the plate 2. Since the heads 11 of the tubes I are complementary to and fit in the seats 27, these tubes 1 cannot rotate when the screws 12 are rotated.

It is the heads 11 of the tubes 1 that hold the plate 2 in place. The screws 12 serve merely to radially expand the tubes 11 to lock them axially to the fitting 3, and they also serve to hold down the decorative plate 22, but in general the screws 12 do not pull the plate 2 axially down. Thus overtightening these screws 12 to damage or deform the plate 2 is virtually impossible.

Figure 6:
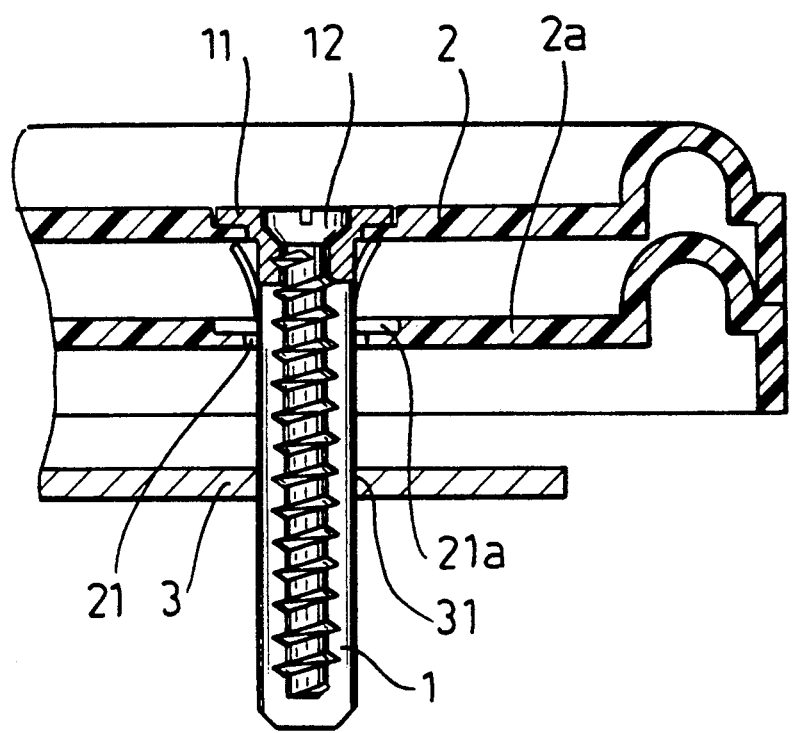
FIG. 6 is a detail view of a variation on the system of this invention.

If the fitting 3 is insufficiently recessed in the wall 4 as shown in FIG. 6 it is possible to place a second plate 2a identical to the plate 2 underneath the plate 2 to act as a spacer.

We claim:

1. In combination with a plumbing fixture that is recessed in a wall, that has a part projecting through the wall, and that is formed offset from the part with a structure hole centered on an axis generally perpendicular to the wall, an escutcheon comprising:
   a plate shaped to fit around the part flatly against the wall and formed offset from the part and axially in line with the structure hole with a throughgoing plate hole;
   at least one radially expansible anchor tube extending through the plate hole, having an enlarged head bearing axially backward against an outer face of the plate, and snugly engaged in the structure hole; and
   a respective screw engaged in the tube, substantially out of contact with the plate, and radially expanding the tube into tight engagement with the structure hole.

2. The escutcheon defined in claim 1 wherein the plate hole is stepped and the head of the anchor tube is recessed in it.

3. The escutcheon defined in claim 2 wherein the tube head and an outer region of the plate hole are of noncircular shape and fit complementarily together, whereby the anchor tube cannot rotate relative to the plate when its head is fitted in the plate hole.

4. The escutcheon defined in claim 1 wherein the anchor tube is formed with at least one outwardly projecting inclined latch finger extending generally axially back toward the plate when the anchor tube is inserted through the plate hole.

5. The escutcheon defined in claim 1 wherein the anchor tube is formed with at least one longitudinally extending expansion slit.

6. In combination:
   a plumbing fixture, recessed in a wall, having a part projecting through the wall along an axis, and formed with a pair of axially throughgoing holes flanking the part and each extending parallel to an axis generally perpendicular to the wall;
   an escutcheon plate shaped to fit around the part flatly against the wall and formed offset from the part and in axial line with each of the fixture holes with a throughgoing plate hole;
   respective radially expansible anchor tubes extending through the plate hole, having an enlarged head bearing axially backward against an outer face of the plate, and snugly engaged in the fixture hole; and
   respective screws engaged in the tubes, substantially out of contact with the plate, and radially expanding the respective tubes into tight engagement with the respective fixture holes.

* * * * *